United States Patent [19]

Speelman

[11] 4,138,318

[45] Feb. 6, 1979

[54] NUCLEAR REACTOR SYSTEM OF THE FAST TYPE

[75] Inventor: Jan E. Speelman, Bergen, Netherlands

[73] Assignee: Neratoom B.V., The Hague, Netherlands

[21] Appl. No.: 650,265

[22] Filed: Jan. 19, 1976

[51] Int. Cl.² ............................................. G21C 15/04
[52] U.S. Cl. ........................................ 176/18; 176/61; 176/65
[58] Field of Search ....................... 176/17, 18, 40, 50, 176/61, 65, 82, 86 M

[56] References Cited

U.S. PATENT DOCUMENTS

| | | | |
|---|---|---|---|
| 3,208,913 | 9/1965 | Hennig | 176/61 |
| 3,275,521 | 9/1966 | Schluderberg et al. | 176/61 |
| 3,338,790 | 8/1967 | Ackroyd et al. | 176/40 |
| 3,345,266 | 10/1967 | Mann et al. | 176/61 |
| 3,486,973 | 12/1969 | Georges et al. | 176/61 |
| 3,773,618 | 11/1973 | Gratton | 176/61 |
| 3,773,619 | 11/1973 | Harrington et al. | 176/86 M |
| 3,892,625 | 7/1975 | Patterson | 176/61 |

FOREIGN PATENT DOCUMENTS

| | | | |
|---|---|---|---|
| 618733 | 4/1961 | Canada | 176/61 |
| 1940014 | 2/1971 | Fed. Rep. of Germany | 176/61 |
| 2179839 | 11/1973 | France. | |
| 6512195 | 3/1967 | Netherlands. | |
| 745460 | 2/1956 | United Kingdom | 176/86 M |
| 946885 | 1/1964 | United Kingdom | 176/61 |

Primary Examiner—Harvey E. Behrend
Attorney, Agent, or Firm—Cushman, Darby & Cushman

[57] ABSTRACT

A nuclear reactor, preferably of the fast type, has a core surrounded by a breeding blanket which is composed of elements extending side by side with gaps therebetween so as to allow in certain conditions a leakage flow to adjust itself between the breeding blanket and an upper plenum. Mixing of the coolant takes place in at least one jet apparatus which operates with the flow of coolant supplied to the reactor vessel as the thrust medium, in such a way that coolant is drawn from the breeding blanket.

5 Claims, 6 Drawing Figures

NUCLEAR REACTOR SYSTEM OF THE FAST TYPE

The invention relates to a nuclear energy reactor system comprising a nuclear reactor, preferably of the fast type, possessing a core of nuclear fuel which operates with fast neutrons, said core being surrounded by a breeding blanket, the core and the breeding blanket being placed within a reactor vessel.

This reactor vessel is furnished with supply and discharge connections for a coolant, liquid sodium in the case at issue, which coolant cools both the core and the breeding blanket inside the reactor vessel. The flow of coolant is divided in the bottom area of the reactor vessel. The larger partial current is passed through the fast reactor core, including the breeding zones arranged at the upper and at the lower end, while the other partial current flows through the radial breeding blanket. The radial breeding blanket is here defined as a zone which extends laterally in the form of a blanket around the core. Both regions are traversed by currents flowing in upward direction. The breeding blanket is composed of elements which extend side by side and each of which comprises a clad. The elements of this blanket are covered at their upper end by lids, also called end walls, while there are outflow openings at the sides of the outflow end of these elements.

The aforementioned elements are arranged interchangeably. Gaps are furthermore provided between these elements, allowing in certain conditions a leakage flow to adjust itself between breeding blanket and upper plenum.

Now the partial current which traverses the radial breeding blanket does not mix in the upper plenum with the partial current which is passed through the core, with the exception of the leakage flow, but mixes with the total flow of coolant which is supplied to the reactor. This results in an increase in the inlet temperature of core and of breeding blanket. Because of this finding, the mass flow restrictions normally occurring in the foot of the elements of the breeding blanket have become superfluous.

This had advantages in removing decay heat by natural circulation, since an adequate flow of coolant can be maintained through the breeding blanket because of the absence of mass flow restrictions in the foot of the aforementioned elements.

The thermohydraulic performance of the reactor system will be more favourable, since no mixing takes place of the relatively cold partial flow from the radial breeding blanket with the relatively hot partial flow from the core.

This also allows a reactor to be designed having a higher outlet temperature than has so far been customary. Another advantage is that a reactor can be designed for which a lower maximum cladding temperature can be reached while maintaining the original outlet temperature, so that a longer effective life of the fuel rods can be attained.

According to a preferred embodiment, mixing takes place in at least one jet apparatus which operates with the flow of coolant supplied to the reactor vessel as the thrust medium, in such a way that this apparatus uses it to draw the coolant from the radial breeding blanket.

It is also possible, however, to have mixing take place before a rotary pump, such as, for example, a centrifugal pump, or to use a flow coupler. The recirculating flow can be made adjustable in all these cases, as will be described in the following, so that a desired flow of coolant through the breeding blanket can be maintained in all conditions.

A particularly favourable embodiment is obtained by arranging inside the reactor vessel one or more immersion coolers which can be used for the discharge of decay heat as well as, in normal conditions, for the supply of heat to the operating medium of the eventual energy circuit. This heat supply can thus be used for reheating the operating medium, for further heating of the feed water between condenser and steam generator, or for the additional generation of electric energy. This can be accomplished, for instance, by means of a separate turbine.

In the situation after a reactor scram, it is important that a thermosiphon cooling circulation in the reactor vessel is supported in such a way that the immersion cooler greatly favours the circulation in the downward flow through the entire jet apparatus towards the lower reactor plenum. This last embodiment can also be advantageously applied to other reactors; in other words, breeding is not strictly necessary, and neither does the reactor have to be restricted to the fast type.

Some examples of embodiment of the invention are further explained on the basis of the appended drawings, where:

Figure 1:
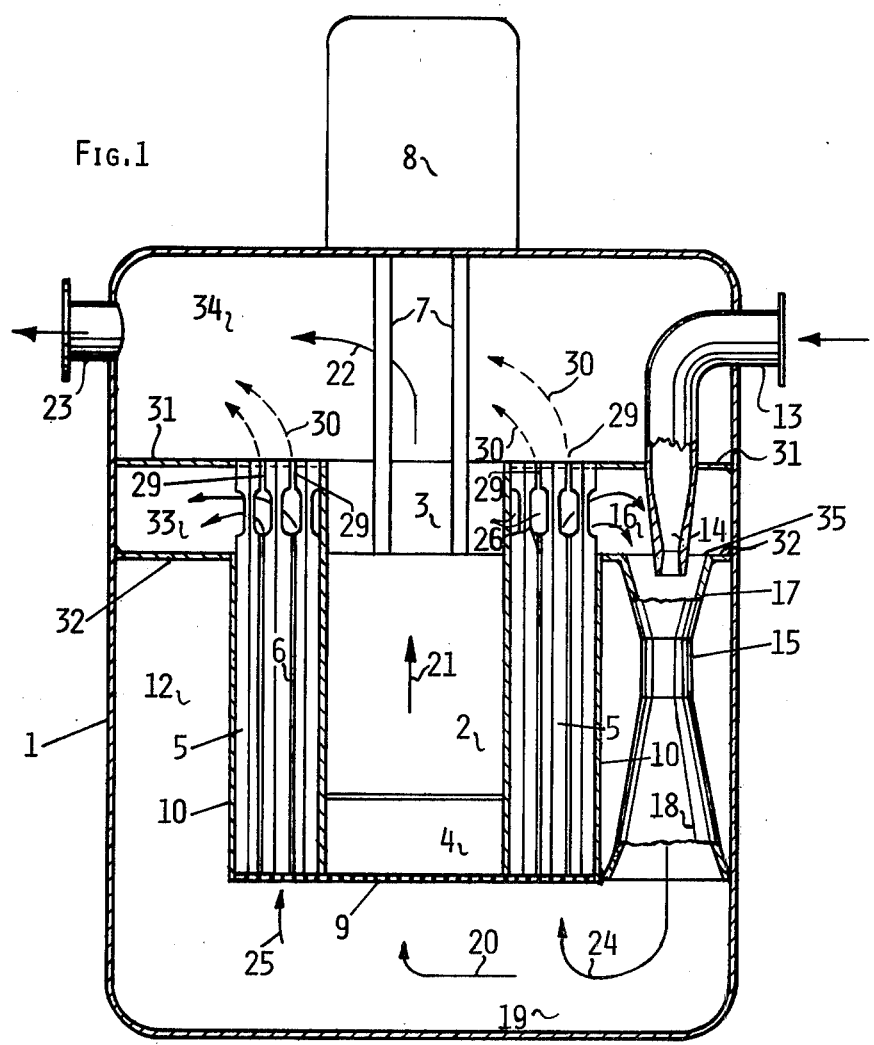
FIG. 1 is a diagrammatic vertical cross section through a reactor according to the invention.

In FIG. 1, the number 1 indicates the reactor vessel within which a reactor core 2 is placed. Above and below this core are the breeding zones 3 and 4, respectively. A breeding blanket 5, composed of elements 6, is arranged in the form of a closed row about the core. Neither in the core of the reactor nor in the zones 3 and 4 are the elements placed therein further indicated. It has been schematically indicated, however, that a number of control elements 7 can become operative from a control station 8 so as to influence the neutron household in core and breeding blanket. The control rods will actually penetrate down into the core 2, but details of this are not shown.

All elements from core and breeding blanket are fitted on a grid 9 which passes the flow of coolant coming from below. A wall 10 separates the larger part of the breeding elements 6 from the cooling space 12 at the side of the core. Two walls 31 and 32 bound a space 33. These walls surround the upper part of the breeding blanket 5. The space 33 communicates on the one hand with openings 26 of the elements 6 and on the other hand with the suction nozzle 35 of the jet apparatus 14–15. The upper plenum 34 occurs above the wall 31. The coolant enters the reactor vessel at 13 and then flows through the injector nozzle 14, where it draws medium 16 from the upper part of the breeding blanket 5.

The two media mix in the tapered receptacle 17 of the jet apparatus, then flow through the throat thereof, and leave the jet apparatus through the diffuser 18. The mixture subsequently reaches the plenum 19, where it divides into two branches. A portion flows along the path 20 and 21 upwards through the reactor core and the breeding zones 3 and 4, whereupon it leaves the reactor vessel along the path 22 at the outlet 23. Another portion flows upwards according to the arrows 24 and 25, thereby cooling the breeding blanket 5 which is placed in the form of a closed row about the core. In the top of the blanket elements, lateral openings 26 are provided through which the coolant can issue at the side, so that it can again reach the jet apparatus 14–15.

Only one jet apparatus is shown in FIG. 1, but in reality a number of these jet apparatuses can be arranged in a closed row about the reactor core. The number 29 indicates gaps which have been left open between the elements 6. These gaps perform an important task in the event of a reactor scram when the pumps of the cooling system may fail to function, so that recourse must be had to cooling by natural circulation for after-cooling the reactor. This is possible because in such a situation the special conditions prevail where, on a percentage basis, an average of three times as much residual heat is generated in a breeding blanket element as is the case in a core element. It is very necessary, therefore, that especially the breeding blanket is effectively cooled in such a case, if boiling of the coolant is to be prevented.

Natural circulation takes place through an external and an internal circuit. The path of the external circuit includes the breeding blanket 5 and the gaps 29. The coolant issues according to the arrows 30, flows through the discharge connection 23 through the external heat exchange circuit (not shown) and back to the inlet connection 13, whereupon it resumes its flow through core 2 and breeding blanket 5, etc.

The internal circuit of the natural circulation also takes place through the breeding blanket 5, but now through the openings 26 and the jet apparatus 14–15, and back to the breeding blanket 5 according to the arrows 24 and 25. The jet apparatus(es) can be so dimensioned that, in normal reactor conditions, the pressures on both sides of the aforementioned gaps are of equal value, so that no internal leakage flow takes place in that case.

Figure 2:
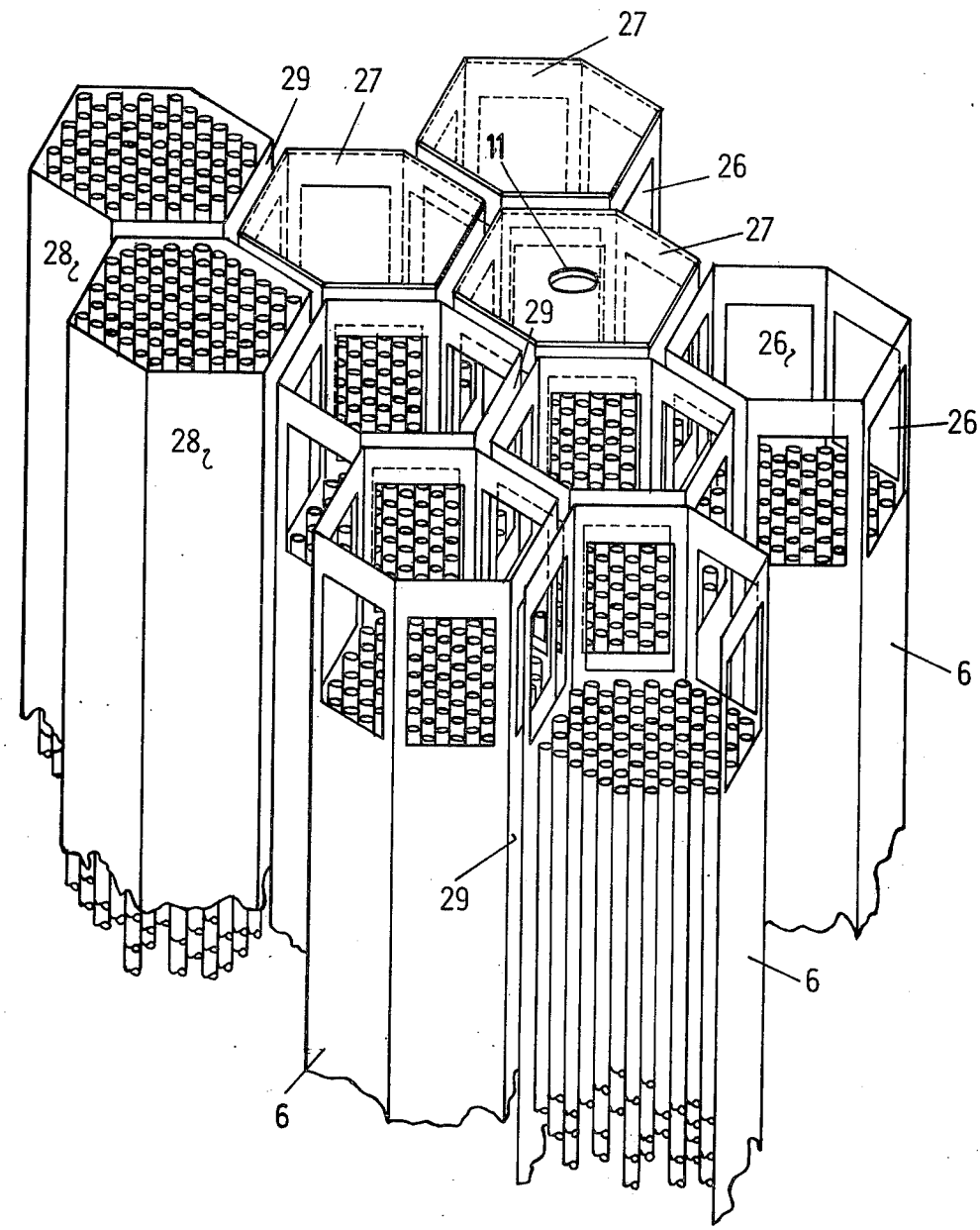
FIG. 2 is a perspective sketch of the upper side of a number of elements of a breeding blanket which is arranged in a closed row about the core.

FIG. 2 is a sketch of a perspective view of the upper end of a number of elements from the breeding blanket 5. Each element 6 is closed at the top by an end wall 27, so that the flow of coolant is forced to issue laterally through the openings 26. The number 28 indicates two fuel elements from the core 2. The gaps which have been left open between the end walls 27 are marked with the number 29. If necessary, it is also possible to provide a number of end walls with additional openings 11, which perform a similar function as the gaps 29.

Figure 3:
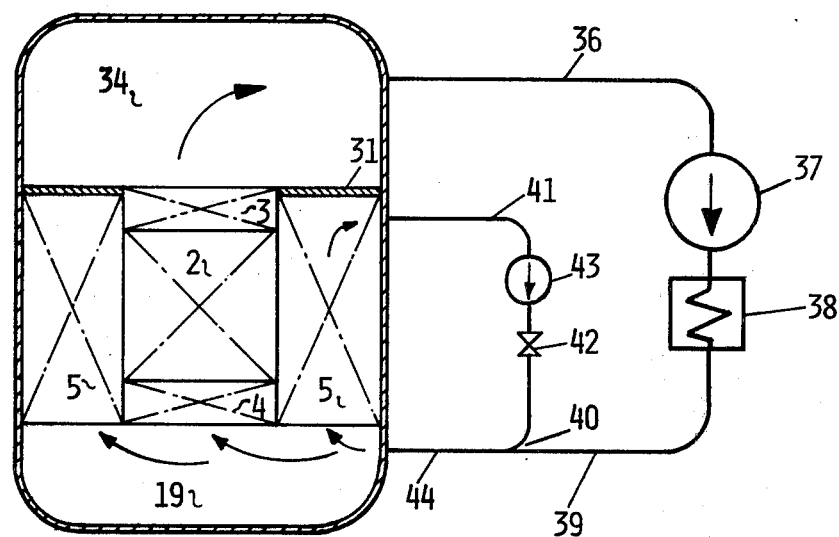
FIG. 3 is a diagram showing the recirculation with a centrifugal pump.

FIG. 3 shows schematically how the main flow from the upper plenum 34 is conveyed to the pump 37, which then thrusts this primary medium through the heat exchanger 38 to the line 39. This last line merges at 40 with the flow of coolant from the breeding blanket 5 which has been passed outside and around the reactor vessel through the line 41, which comprises a closing element 42 and a pump 43.

Figure 4:
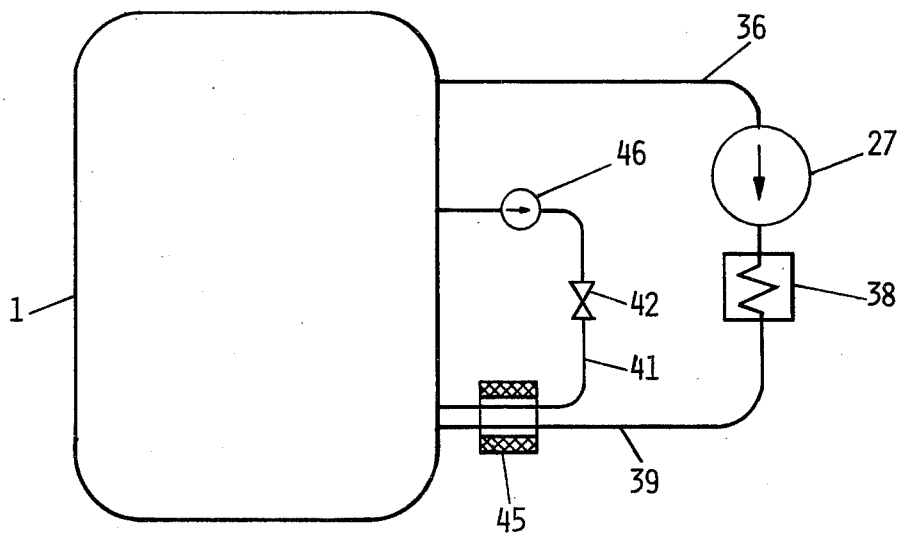
FIG. 4 is a diagram of recirculation by means of a flow coupler.

FIG. 4 shows in a simple manner how use can be made of a flow coupler 45 instead of a pump 43. This is an element which, using a common magnetic field induced by the magnetic windings of 45, couples the amounts of flow that pass through the lines 41 and 39 in such a way that, if there is a flow in one of these lines, the flow in the other line will follow automatically. Such flow couplers can be so designed that a desired ratio is maintained between the mass flow in the line 39 and that in the line 41.

Figure 5:
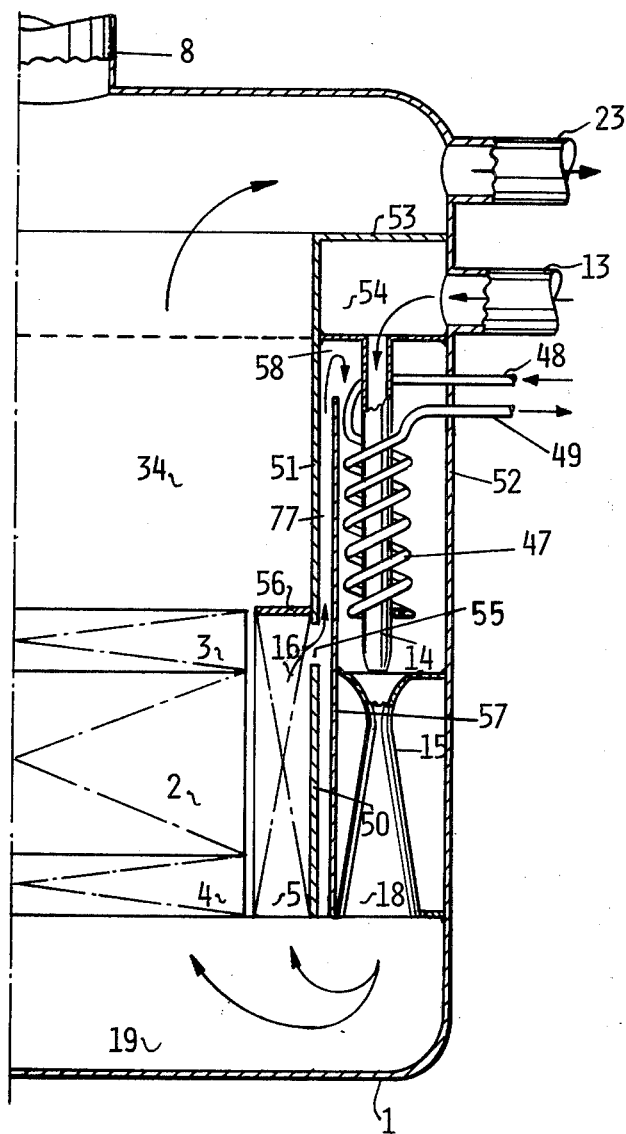
FIG. 5 is a diagrammatic representation in a vertical cross section through the right half of a reactor vessel of an immersion cooler placed therein.

FIG. 5 shows in a half, diagrammatic vertical cross section through the reactor vessel how an immersion cooler 47 can be placed in the space at the side of the reactor core. In the embodiment shown, the immersion cooler is designed as a helical coil provided around the nozzle 14 of the jet apparatus. The immersion cooler can also constitute a separate unit arranged above the jet apparatus. A flow of coolant is supplied to this cooling coil through the line 48 and discharged through the line 49. At the side of the breeding blanket 5, a partition 50 is arranged, which extends as the partition 51 into the upper end of the upper plenum 34. The space which thus remains between 51 and the outer wall 52 of the reactor vessel is closed at the upper end by an annular plate 53, so that a plenum 54 is formed which serves as a space from which the jet apparatuses can be supplied.

The total flow of coolant is supplied to this plenum through the line 13, and the heated flow of coolant is removed from the upper plenum 34 through the line 23. Just below the cover plate 56 of the breeding blanket 5, a passage 55 is provided in the partition 50. The flow of coolant, having been thrust through the breeding blanket 5, can reach through this opening the space 77 which has been left between the partition 51 and a casing 57 which has been arranged around the reactor core. The flow of coolant from the breeding blanket is thus conveyed upwards through the space 77, whereupon it is reversed in the space 58 in order to flow downwards along the windings of the immersion cooler 47.

Heat is there released, whereupon this flow mixes in the jet apparatus 15 with the main flow and thus reaches the lower plenum 19 again.

Figure 6:
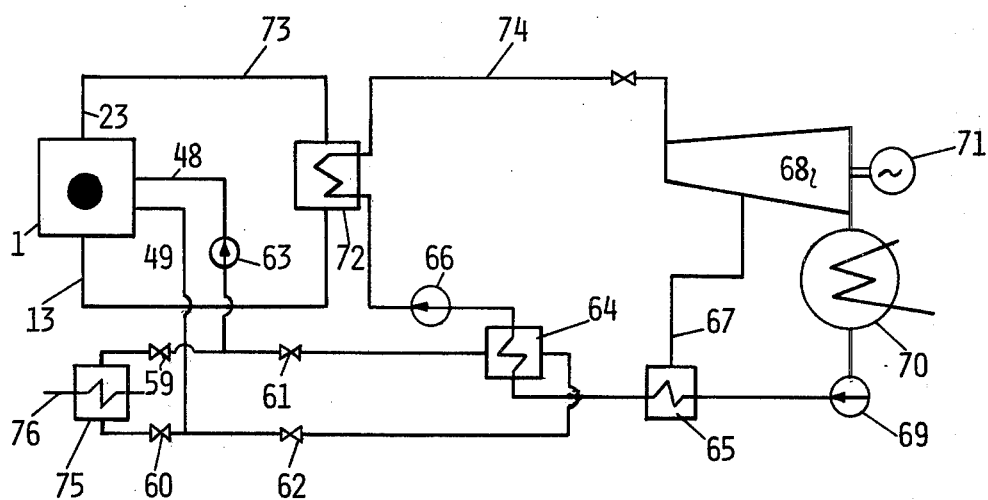
FIG. 6 is a diagram of the utilization of heat originating from the immersion cooler(s) for further preheating the feed water.

In normal conditions the lines 48 and 49 can be connected with one or more heat exchangers having the purpose of reheating the operating medium, additional generation of electric energy or additional preheating of the feed water. This last possibility is further explained, by way of example, on the basis of FIG. 6.

This figure diagrammatically shows the nuclear reactor with the supply pipe 13 and the discharge pipe 23 for the main flow of coolant. The numbers 48 and 49 again indicate the supply and discharge lines for the immersion coolers placed inside the reactor vessel. In normal conditions the shut-off valves 59 and 60 are closed, while the shut-off valves 61 and 62 are open. The pump 63 can thus supply heat from the immersion coolers to a heat exchanger 64 arranged beyond a heat exchanger 65 which operates by means of steam 67 extracted from the steam turbine 68.

In this diagram, 66 furthermore indicates a feed water pump and 69 a condensate pump, while 70 is the condenser; 71 is the electric generator and 72 the heat exchanger where the heat from the primary circuit 73 is transmitted to the secondary circuit 74.

When a scram has taken place, the shut-off valves 59 and 60 are opened, whereupon the valves 61 and 62 are closed. The pump 63 now thrusts the coolant in the circuit 48–49 through a cooler 75, which removes the decay heat with the aid of a coolant 76, of which the details are not shown.

I claim:

1. In a nuclear energy reactor system a nuclear reactor core of nuclear fuel; a breeding blanket having a portion which radially surrounds the core; a reactor vessel surrounding the core and blanket and providing an inflow plenum below the core and blanket and an outflow plenum above the core and blanket, the vessel having supply and discharge connections for a flow of coolant through the vessel; means for dividing the flow of coolant into two separate currents and for passing one of the currents separately in straight flow upward through said portion of the breeding blanket while passing the other current upward through the reactor core into the outflow plenum; means for discharging coolant from the upper end of said portion of said breeder blanket partly into the outflow plenum and partly into the inflowing coolant entering the vessel through said supply connection; and means including a pump system for mixing the inflowing coolant with the coolant being discharged thereinto from said portion of said breeder blanket.

2. A system as in claim 1 wherein the pump system includes at least one jet apparatus operating with the inflowing coolant to draw in coolant from said portion of the breeding blanket.

3. A system as in claim 2 wherein said portion of the breeding blanket includes vertically disposed breeder elements which extend side by side, each of the elements having a side wall defining an upward coolant flow path through the respective element, said means for discharging coolant from said breeding blanket portion including sidewise discharge openings in the upper ends of said side walls communicating with the suction side of the jet apparatus and said discharge means further including gaps between adjacent breeder elements communicating with said outflow plenum.

4. A system as in claim 3 wherein the breeder elements include upper end walls arranged as a flat upper boundary of said portion of the breeding blanket, at least some of the end walls having an opening therethrough.

5. A system as in claim 1 wherein the pump system includes at least one jet apparatus operating with inflowing coolant being supplied to the reactor vessel for drawing in coolant from said portion of the breeding blanket, said system further including an energy generating secondary circuit having a heat-exchanger therein; an immersion cooler having a coolant passage therein disposed in said reactor between the vessel wall and the breeding blanket; and means for reversibly connecting the immersion cooler passage to said heat exchanger.

* * * * *